(12) United States Patent  
Humphrey et al.

(10) Patent No.: US 9,097,788 B1  
(45) Date of Patent: Aug. 4, 2015

(54) BAGGAGE TRACKER

(71) Applicants: Emily Humphrey, Jacksonville, NC (US); Frederick Humphrey, Jacksonville, NC (US); Aubrey McDade, Jacksonville, NC (US); LaKeila McDade, Jacksonville, NC (US)

(72) Inventors: Emily Humphrey, Jacksonville, NC (US); Frederick Humphrey, Jacksonville, NC (US); Aubrey McDade, Jacksonville, NC (US); LaKeila McDade, Jacksonville, NC (US)

(*) Notice: Subject to any disclaimer, the term of this patent is extended or adjusted under 35 U.S.C. 154(b) by 35 days.

(21) Appl. No.: 13/943,225

(22) Filed: Jul. 16, 2013

(51) Int. Cl.
G08B 1/08 (2006.01)
G01S 5/02 (2010.01)
A45C 3/00 (2006.01)
G08B 21/02 (2006.01)

(52) U.S. Cl.
CPC .............. *G01S 5/0294* (2013.01); *A45C 3/00* (2013.01); *G08B 21/0269* (2013.01)

(58) Field of Classification Search
CPC ......... A45C 3/00; G01S 19/42; G01S 5/0027; G08B 21/0269
USPC .................. 340/539.13, 539.11; 342/357.25, 342/357.54; 383/12, 13
See application file for complete search history.

(56) References Cited

U.S. PATENT DOCUMENTS

| 5,452,777 | A | * | 9/1995 | Giovannella | 190/102 |
| 6,265,975 | B1 | | 7/2001 | Zimmerman | |
| D526,985 | S | | 8/2006 | Neher et al. | |
| 7,535,358 | B2 | | 5/2009 | Crider et al. | |
| 7,916,025 | B2 | | 3/2011 | Locker et al. | |
| 8,253,557 | B2 | | 8/2012 | Ani et al. | |
| 8,742,922 | B2 | * | 6/2014 | Ferrari | 340/539.13 |
| 2005/0232517 | A1 | * | 10/2005 | Reid | 383/24 |
| 2011/0205021 | A1 | | 8/2011 | Ferrari | |
| 2012/0273314 | A1 | * | 11/2012 | Raymond et al. | 190/18 A |
| 2013/0050019 | A1 | * | 2/2013 | Mahmoud | 342/357.25 |

* cited by examiner

*Primary Examiner* — John A Tweel, Jr.

(57) ABSTRACT

A luggage tracking assembly for tracking luggage during air travel and providing location information or other luggage related information to a remote device. The assembly includes a housing. Each of a processor, a transceiver, and a positioning mechanism are coupled to the housing. The transceiver is communicatively coupled to the processor. The positioning mechanism is configured for determining a physical location of the housing relative to earth. The housing is insertable into an interior space of a pouch coupled to a piece of luggage. A closure is coupled to the pouch securing the housing in the interior space of the pouch. A fastener couples the pouch to the piece of luggage. The transceiver is configured for transmitting location data to a remote device wherein the physical location of the housing relative earth is determinable through operation of the remote unit.

7 Claims, 4 Drawing Sheets

BAGGAGE TRACKER

BACKGROUND OF THE DISCLOSURE

Field of the Disclosure

The disclosure relates to tracking devices and more particularly pertains to a new tracking device for tracking luggage during air travel and providing location information or other luggage related information to a remote device.

SUMMARY OF THE DISCLOSURE

An embodiment of the disclosure meets the needs presented above by generally comprising a housing. Each of a processor. a transceiver, and a positioning mechanism are coupled to the housing. The transceiver is communicatively coupled to the processor. The positioning mechanism is configured for determining a physical location of the housing relative to earth. The housing is insertable into an interior space of a pouch coupled to a piece of luggage. A closure is coupled to the pouch securing the housing in the interior space of the pouch. A fastener couples the pouch to the piece of luggage. The transceiver is configured for transmitting location data to a remote device wherein the physical location of the housing relative to earth is determinable through operation of the remote unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
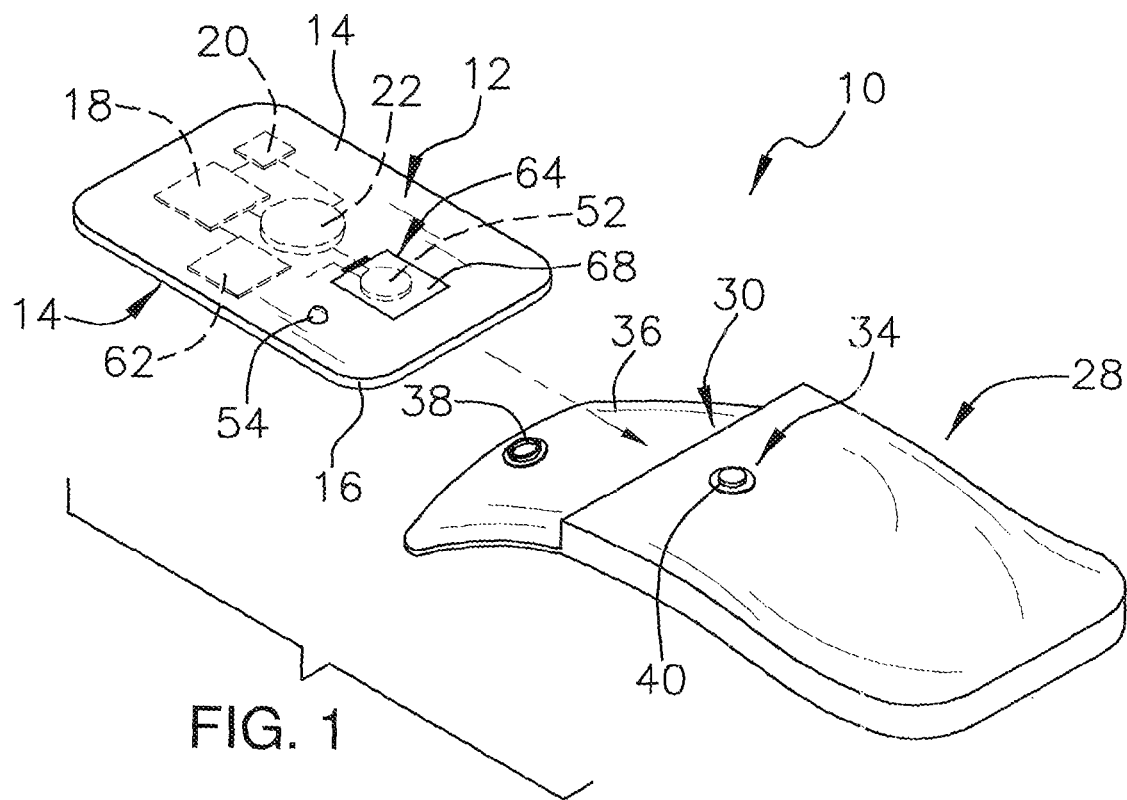
FIG. 1 is a partially exploded top front side perspective view of a luggage tracking assembly according to an embodiment of the disclosure.
Figure 2:
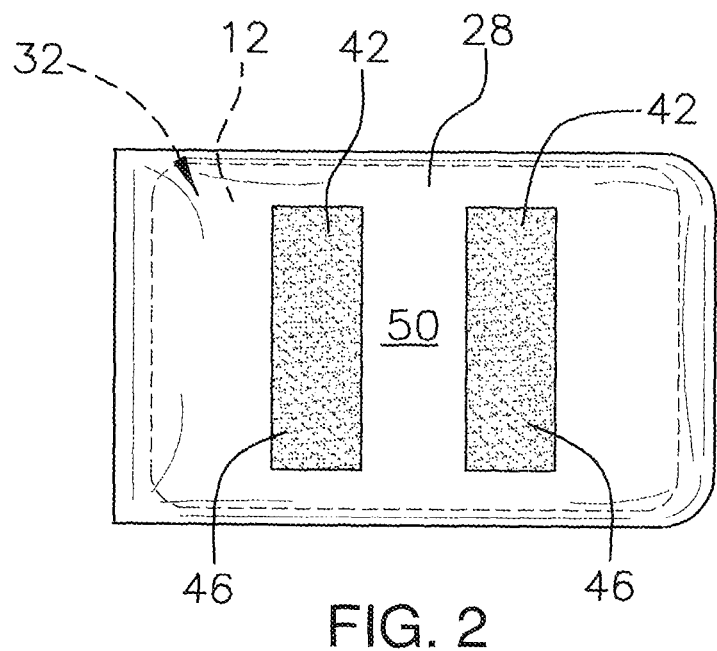
FIG. 2 is a back view of an embodiment of the disclosure.
Figure 3:
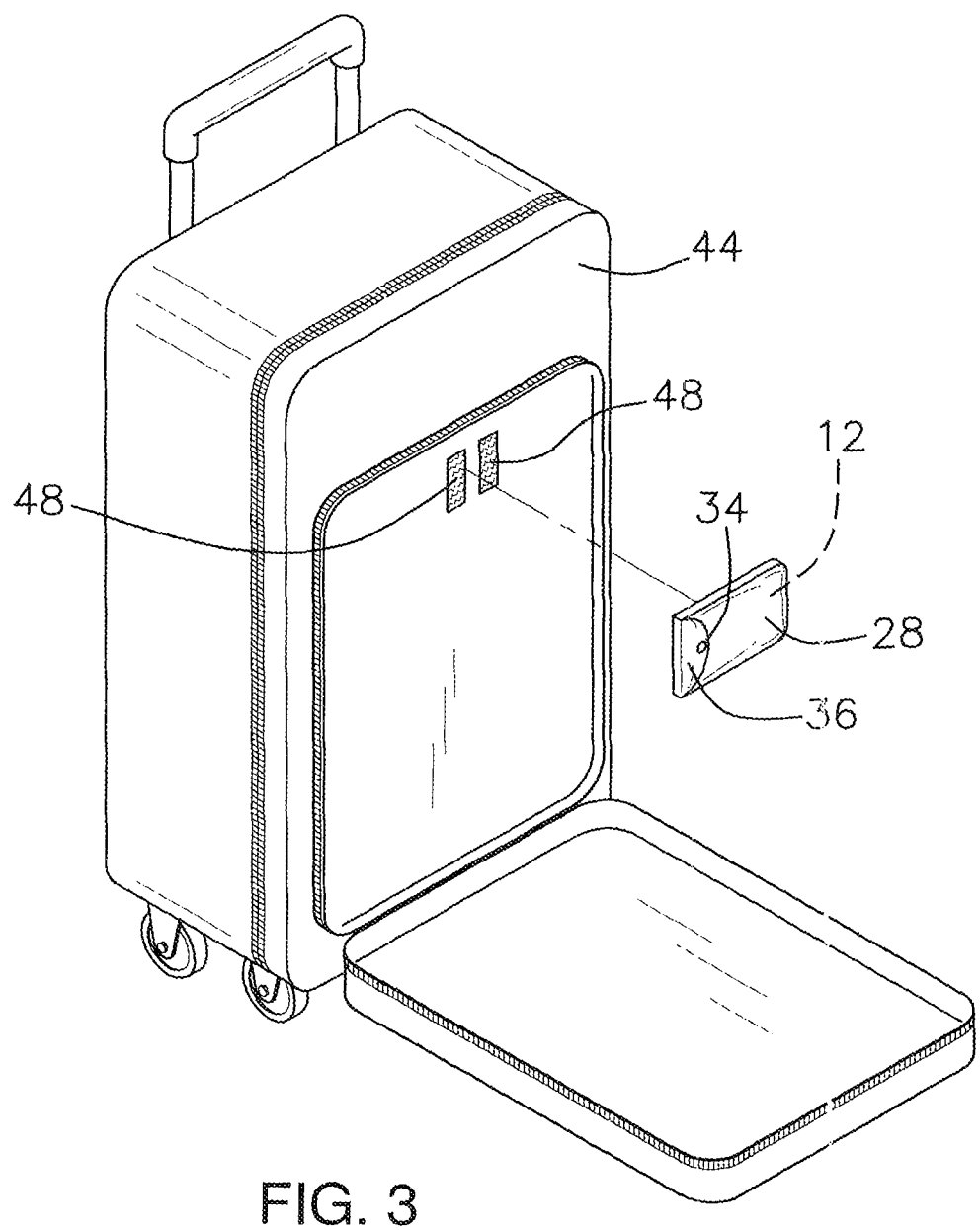
FIG. 3 is a partially exploded top front side perspective view of an embodiment of the disclosure.
Figure 4:
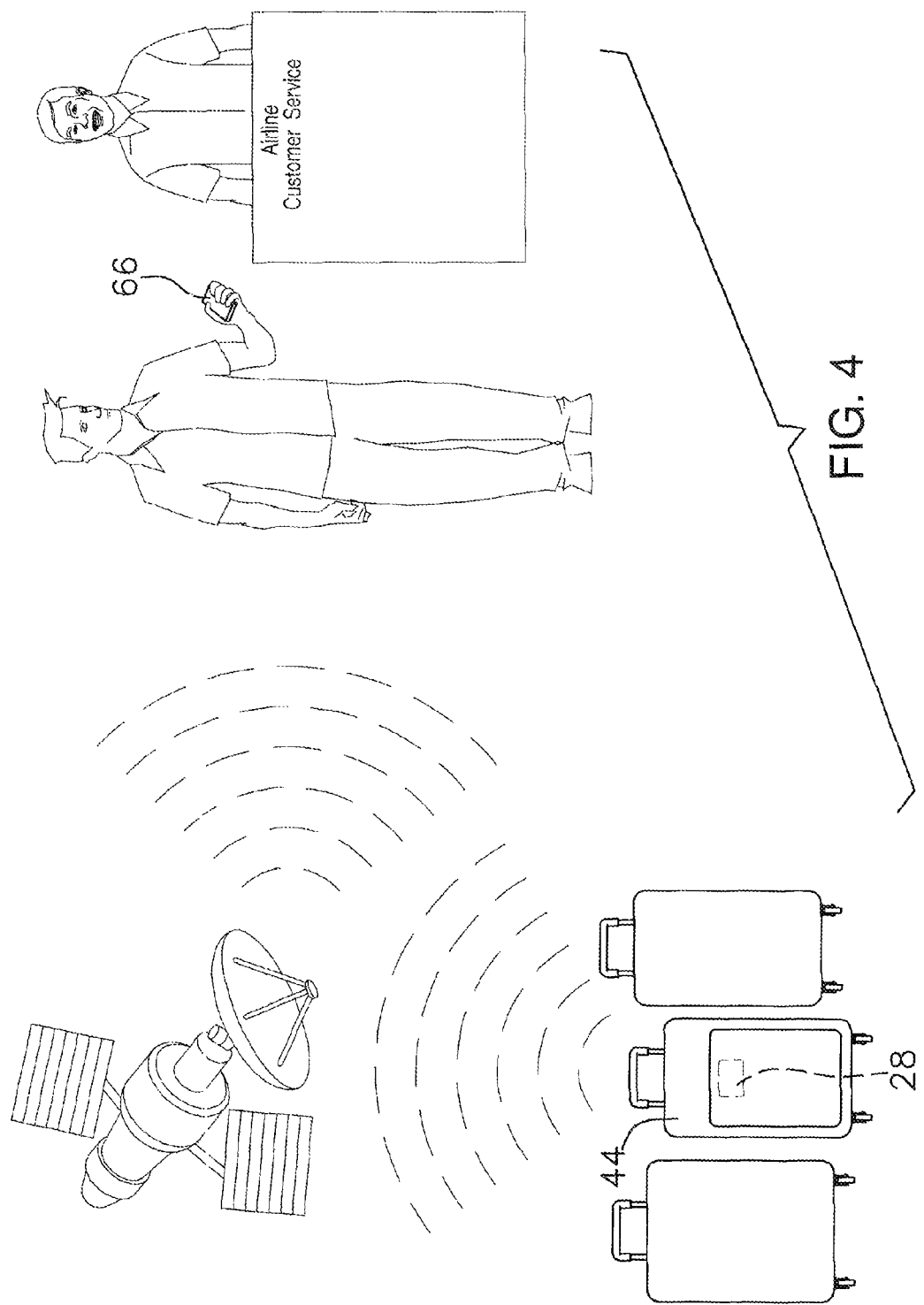
FIG. 4 is a front view of an embodiment of the disclosure in use.
Figure 5:
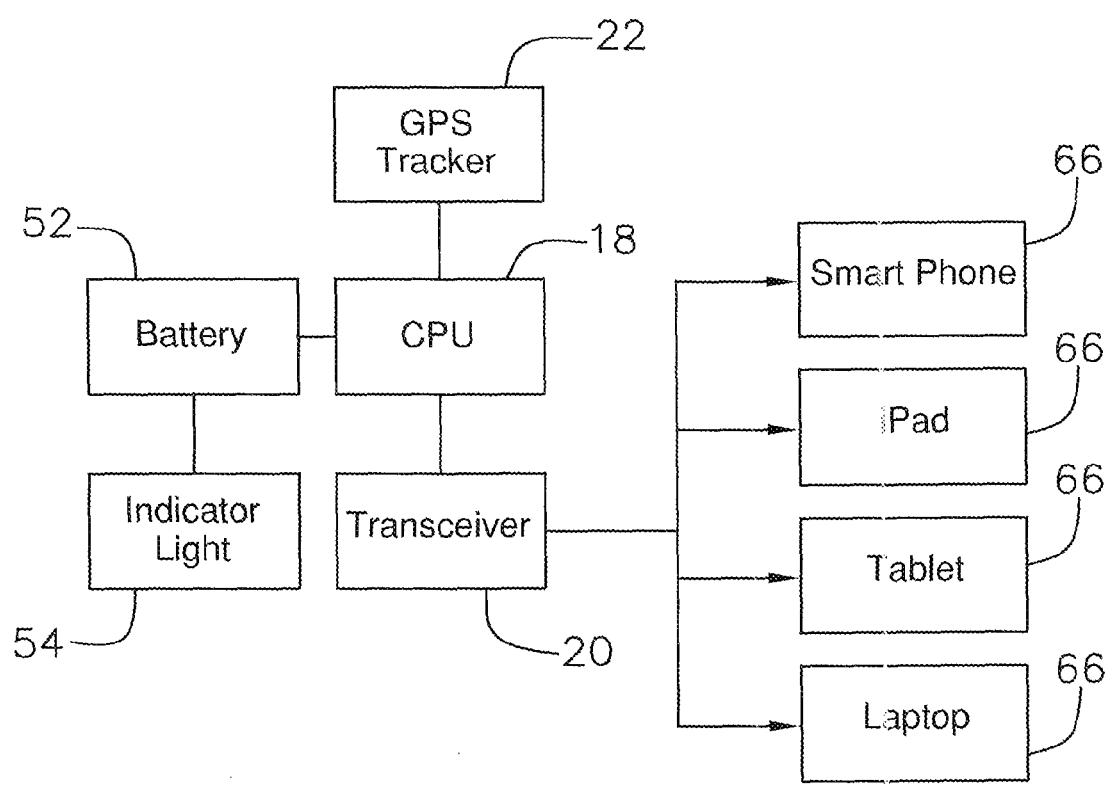
FIG. 5 is a schematic view of an embodiment of the disclosure.

With reference now to the drawings, and in particular to FIGS. 1 through 5 thereof, a new tracking device embodying the principles and concepts of an embodiment of the disclosure and generally designated by the reference numeral 10 will be described.

As best illustrated in FIGS. 1 through 5, the luggage tracking assembly 10 generally comprises a housing 12. The housing 12 may be is a substantially planar panel similar in size to a conventional credit card, driver's license, or the like. The housing 12 has a pair of substantially rectangular faces 14 and a perimeter edge 16 extending around and between the faces 14. A processor 18 is coupled to the housing 12 and positioned between the faces 14. A transceiver 20 is also coupled to the housing 12 and communicatively coupled to the processor 18. The transceiver 20 is positioned between the faces 14 of the housing 12. A positioning mechanism 22 is coupled to the housing 12 and configured for determining a physical location of the housing 12 relative to earth. This may be achieved through a global positioning system, triangulation from cellular towers, or the like. The positioning mechanism 22 may be positioned between the faces 14 of the housing 12 and interactively coupled to the transceiver 20 to determine the location of the housing 12.

A pouch 28 has an opening 30 into an interior space 32 of the pouch 28. The housing 12 is insertable into the interior space 32 of the pouch 28. A closure 34 is coupled to the pouch 28 wherein the housing 12 is selectively securable in the interior space 32 of the pouch 28. The closure 34 may be a flap 36 coupled to the pouch 28 adjacent to and extending over the opening 30 into the interior space 32 of the pouch 28.

The closure 34 may further comprise a first snap section 38 coupled to the flap 36 and a second snap section 40 complementary to the first snap section 38. The second snap section 40 is coupled to the pouch 28. The flap 36 extends over and covers the opening 30 into the pouch 28 when the first snap section 38 is engaged to the second snap section 40. The flap 36 may have a width coextensive with the opening 30 such that the opening 30 is completely coverable by the flap 36.

A fastener 42 is coupled to the pouch 28 wherein the pouch 28 is configured for coupling to a piece of luggage 44 a person wishes to track. The fastener 42 may be a first portion 46 of hook and loop fastener configured for coupling to the piece of luggage 44 and a second portion 48 of hook and loop fastener complementary to the first portion 46. The second portion 48 is coupled to an exterior face 50 of the pouch 28 such that the pouch 28 remains substantially flat against the luggage 44 when coupled to the luggage 44.

A battery 52 is coupled to the housing 12 and electrically coupled to the processor 18, the transceiver 20, and the positioning mechanism 22. An indicator light 54 may be coupled to the housing 12 and electrically coupled to the battery 52 wherein the indicator light 54 indicates the battery 52 remains charged and the assembly 10 is working. The battery 52 may be positioned in a compartment 64 of the housing 12 covered by a battery door 68. The indicator light 54 may change color or flash when the battery 52 needs to be replaced.

The transceiver 20 is configured for transmitting location data determined from the positioning mechanism 22 to a selectable remote device 66 such as a cellular phone, computer, or the like. Thus, the physical location of the housing 12 relative earth is determinable through operation of the remote unit 66.

A memory unit 62 may be communicatively coupled to the processor 18 and positioned in the housing 12. The memory unit 62 may be programmed through transmissions to the transceiver 20 to list data about the luggage 44 such as contents, estimated value, bag brand and color, and the like.

In use, the housing 12 is positioned on the luggage 44 by attaching the pouch 28 to the luggage 44 and securing the housing 12 in the interior space 32 of the pouch 28. The pouch 28 may be positioned on an interior of the luggage 44 to prevent the pouch 28 from being dislodged from the luggage 44 during travel. The remote device 66 is used to communicate with the assembly 10 to access the location of the housing 12 and the data in the memory unit 62 as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A luggage tracking device comprising:
   a piece of luggage;
   a housing;
   a processor coupled to said housing;
   a transceiver coupled to said housing, said transceiver being communicatively coupled to said processor;
   a positioning mechanism coupled to said housing configured for determining a physical location of said housing relative to earth;
   a pouch having an opening into an interior of said pouch, said housing being insertable into said interior space of said pouch;
   a closure coupled to said pouch wherein said housing is selectively securable in said interior space of said pouch;
   a fastener coupled to said pouch wherein said pouch is couplable to said piece of luggage such that said pouch is coupled to and positioned within an interior of said piece of luggage; and
   wherein said transceiver is configured for transmitting location data to a remote device wherein said physical location of said housing relative earth is determinable through operation of the remote unit.

2. The device of claim 1, further comprising a battery coupled to said housing, said battery being electrically coupled to said processor, said transceiver, and said positioning mechanism.

3. The device of claim 1, further comprising said housing being a substantially planar panel.

4. The device of claim 1, further comprising said fastener being a first portion of hook and loop fastener coupled to said interior of said piece of luggage and a second portion of hook and loop fastener complementary to said first portion of hook and loop fastener coupled to an exterior face of said pouch.

5. The device of claim 1, further comprising said closure being a flap coupled to said pouch, said flap extending over said opening into said interior space of said pouch, said closure further comprising a first snap section coupled to said flap and a second snap section complementary to said first snap section being coupled to said pouch, said flap extending over and covering said opening into said pouch when said first snap section is engaged to said second snap section.

6. The device of claim 2, further comprising an indicator light coupled to said housing, said indicator light being electrically coupled to said battery wherein said indicator light is configured for indicating said battery remains charged.

7. A luggage tracking device comprising:
   a piece of luggage having an interior:
   a housing, said housing being a substantially planar panel having a pair of substantially rectangular faces and a perimeter edge extending around and between said faces;
   a processor coupled to said housing, said processor being positioned between said faces;
   a transceiver coupled to said housing, said transceiver being communicatively coupled to said processor, said transceiver being positioned between said faces;
   a positioning mechanism coupled to said housing configured for determining a physical location of said housing relative to earth, said positioning mechanism being positioned between said faces;
   a pouch having an opening into an interior of said pouch, said housing being insertable into said interior space of said pouch;
   a closure coupled to said pouch wherein said housing is selectively securable in said interior space of said pouch, said closure being a flap coupled to said pouch, said flap extending over said opening into said interior space of said pouch, said closure further comprising a first snap section coupled to said flap and a second snap section complementary to said first snap section being coupled to said pouch, said flap extending over and covering said opening into said pouch when said first snap section is engaged to said second snap section;
   a fastener coupled to said pouch wherein said pouch is couplable to said piece of luggage such that said pouch is coupled to and positioned within said interior of said piece of luggage, said fastener being a first portion of hook and loop fastener coupled to said interior of said piece of luggage and a second portion of hook and loop fastener complementary to said first portion of hook and loop fastener coupled to an exterior face of said pouch;
   a battery coupled to said housing, said battery being electrically coupled to said processor, said transceiver, and said positioning mechanism;
   an indicator light coupled to said housing, said indicator light being electrically coupled to said battery wherein said indicator light is configured for indicating said battery remains charged;
   a memory unit being positioned in said housing and communicatively coupled to said processor, said memory unit being communicatively coupled to said transceiver to program data about the luggage into said memory unit; and
   wherein said transceiver is configured for transmitting location data to a remote device wherein said physical location of said housing relative earth is determinable through operation of the remote unit.

* * * * *